May 31, 1960  C. M. YEOMANS  2,938,847
REACTOR WITH HORIZONTAL CONTROL ROD MOVING MECHANISMS
Filed Oct. 1, 1957  2 Sheets-Sheet 1

INVENTOR.
CLIVE YEOMANS
BY Benjamin G. Weil
ATTORNEYS

May 31, 1960     C. M. YEOMANS     2,938,847
REACTOR WITH HORIZONTAL CONTROL ROD MOVING MECHANISMS
Filed Oct. 1, 1957     2 Sheets-Sheet 2
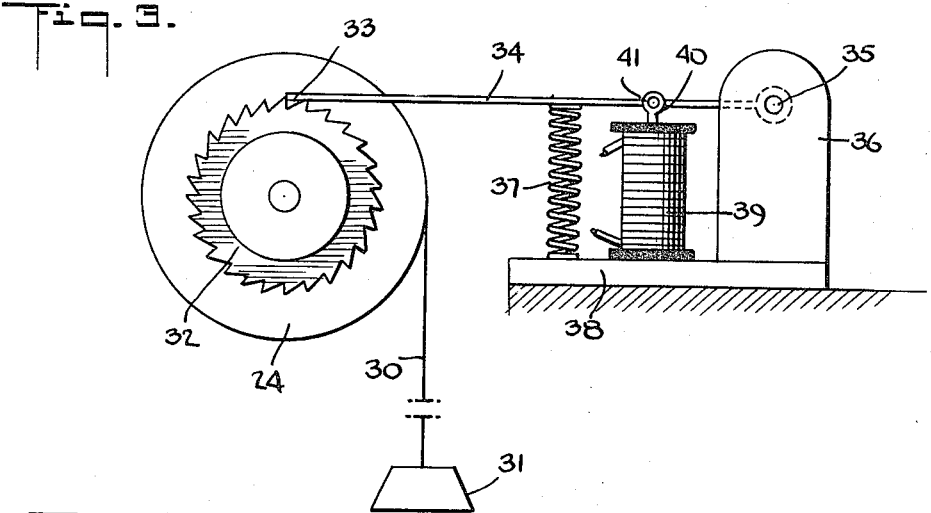
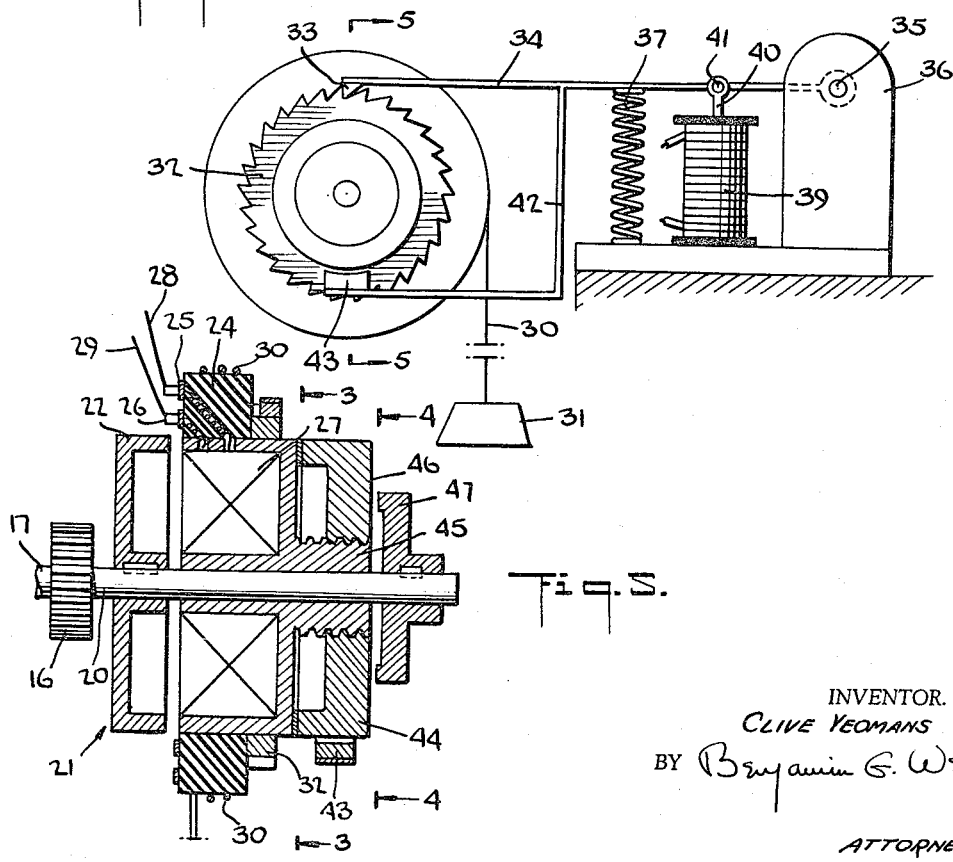
INVENTOR.
CLIVE YEOMANS
BY Benjamin G. Weil
ATTORNEYS

United States Patent Office 2,938,847
Patented May 31, 1960

2,938,847

REACTOR WITH HORIZONTAL CONTROL ROD MOVING MECHANISMS

Clive M. Yeomans, Towson, Md., assignor to The Martin Company, Middle River, Md., a corporation of Maryland Filed Oct. 1, 1957, Ser. No. 687,515

8 Claims. (Cl. 204—193.2)

This invention relates to control rod systems for nuclear reactors and more particularly to improved means for controlling the power output of reactors of the pressurized water type, and for providing effective cut-off on the occurrence of emergency conditions requiring such action.

Nuclear reactors of the type mentioned present control problems not normally encountered in non-pressurized systems. Among the greater difficulties encountered is the operation of mechanical and electrical components under water particularly under the high pressures involved.

Objects and features of the instant invention are to overcome these difficulties by removal of the operating mechanisms from the pressurized areas and at the same time provide improved control means for normal and emergency operation of the control rods.

Another difficulty is that emergency conditions arise during reactor operation which require immediate shutdown of the reactor by operation of its control rods to completely inserted position. This so-called "scram" operation requires a "scram" operating mechanism whose operation is not affected by power failures of any kind that may occur simultaneously with or as a result of the occurrence of an emergency or "scram" condition.

Principal objects and features of this invention are the provision of "scram" operating mechanism which is independent entirely of power failures.

Another difficulty encountered in present reactor construction is the limited space available for the control rods. This space limitation is inherent in the construction of pressurized end or top entry actuators which require a relatively large diametrical space in which to operate, making the use of small diametered rods impractical. The space limitations also necessitate the use of a small number of rods each of which must be of considerable worth to be effective in control operations. Since each rod then has a large percentage control, its control movement consequently must be precisely regulated to avoid undesirable power excursions.

Other objects and features of this invention are provision of an effective control rod arrangement in which each control rod has reduced dimensions over those heretofore used and only a small percentage worth, thus reducing the requirement for accurate positioning. Moreover, since the rods utilized in this invention may be but half the length of conventional rods, the time required for their full insertion for an emergency shutdown or "scram" operation is substantially half that for usual control rods operated at the same insertion speed.

Further objects and features of this invention are the elimination of the requirement for positioning of operating equipment at the top of the pressurized reactor, thus making it possible to remove all or any part of the fuel from the reactor core without disturbing the control rods or their operating mechanisms.

Other objects and features of the invention are the provision of structure permitting individual movement, removal and replacement of control rods while the reactor is in operation.

Other objects and features of the invention are the use of control rod arrangements whose operating mechanisms may be constructed from commercially available equipment rather than requiring use of custom built mechanisms.

Further objects and features of the invention are the provision of a reactor equipped with horizontally movable control rods arranged in tiers, each control rod being separately movable within a sheath into and out of the reactor without danger of fluid leakage from the reactor and wherein the individual control rods may be inserted or withdrawn from their sheaths to provide a desirable flux or temperature pattern within the core and wherein the individual control rods may be conveniently cooled if necessary and desired by circulation of cooling medium through the sheaths without disturbance of the pressurized water system, and wherein the tier arrangement of the control rods increases space available for reactor fuel.

Still other objects and features of the invention are the provision of novel control rod moving mechanisms in conjunction with "scram" control rod moving mechanism which are non-interfering in their respective control rod moving actions at required times of operation, and in which the "scram" mechanism is entirely independent of power failures that may occur during reactor operation so that safe operation of the reactor is possible.

Other objects, advantages and features of this invention will become apparent from the following description and the accompanying drawings wherein:

Figure 3 is a sectional view of "scram" mechanism embodying the invention taken along line 3—3 of Figure 5;

Figure 4 is a sectional view of said mechanism taken along line 4—4 of Figure 5; and Figure 5 is a sectional view of the mechanism taken along line 5—5 of Figure 4.

Figure 1:
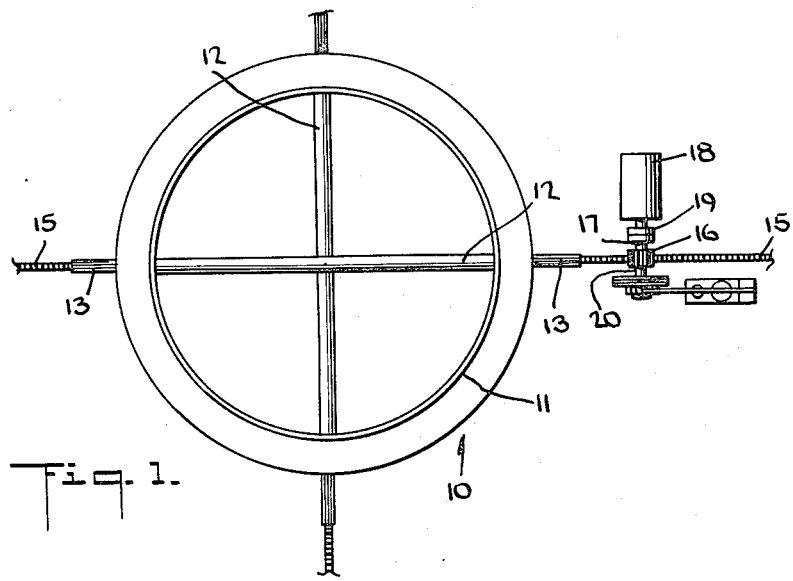
Figure 1 is a partial plan view of a reactor core with its cover removed.
Figure 2:
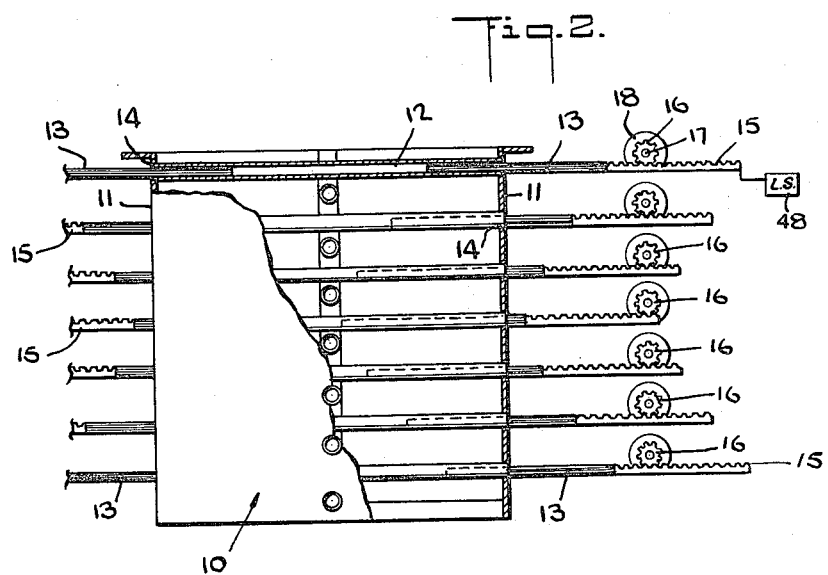
Figure 2 is a partially broken away elevation of the reactor core equipped with this invention.

Referring to the drawing and first to Figures 1 and 2, a reactor 10 having a housing 11 is traversed by a plurality of horizontally disposed tubes 12 which serve as sheaths for horizontally movable control rods 13. In the embodiment shown the sheaths 12 are disposed in horizontal rows or tiers, with alternate tubes in each tier having their entrances at opposite wall locations in the housing. The tubes in alternating tiers may be disposed at right angles to each other. Any other suitable tube pattern may be provided.

The individual sheaths 12 may, if desired (but not shown), have cooling fluid circulated therein either by direct introduction or by circulation in a surrounding jacket (not shown). The disposition of the sheaths 12 and the extent of insertion therein of respective control rods 13 may provide any desirable flux or temperature pattern in the reactor core.

In the embodiment shown, each tube 12 has its outermost end secured in an appropriate opening 14 in the housing 11 as by a welded seam that is sealed against gas and liquid leakage so that the liquid and/or gaseous contents of the housing 11 cannot escape through the openings 14. The inner or opposite ends of the respective sheaths or tubes 12 traverse the respective chords of the housing and are secured in sealing relationship to corresponding openings in the housing wall opposite openings 14. In the alternative, if these tubes do not extend entirely across the housing, these inner ends are provided with sealing closures (not shown) to prevent egress via the sheaths or tubes of the gaseous or fluid contents of the reactor housing 10.

A longitudinally movable control rod 13 is provided for each tube or sheath 12 and is composed of suitable absorption material, for example, boron. These control rods 13 are of sufficient length to be insertable to the full lengths of the sheaths 12. The tier-like disposition of the sheaths 12 and control rods 13 provide added fuel space in the reactor core over that available in many conventional vertical rod reactors.

During reactor operation, emergencies arise which require rapid shutdown. Such an emergency condition is dealt with in practice by speedy insertion of the control rods to the full lengths of the sheaths 12 to effect a quickly required shutdown. Since the control rods 13 are horizontally disposed, mechanical activation means is required to effect their necessary movements for operational control of the reactor and in addition separate non-interfering mechanism is required to cope with emergency conditions.

In the embodiment shown, horizontal longitudinal movement of the respective control rods for control or "scram" operation is effected by equipping each with a drive rack 15 at its outer end which cooperates with a drive gear 16 mounted on a drive shaft 17. For control movements, a drive motor 18 coupled, for example, through a magnetic clutch 19 to each drive shaft 17, serves to rotate the latter and its gear 16 when the clutch 19 is "in," i.e. activated electrically. The motor and clutch 19 serve as normal rod feed mechanism during usual reactor operation.

To cope with "emergency" conditions, the drive shaft 17 is prolonged at 20 forwardly of the drive gear 16 as seen in Figure 5 to extend through a magnetic clutch 21 whose components include a drive plate 22 keyed to the drive shaft extension 20 and a housing 23 which is freely rotatable on shaft 20 and also movable longitudinally thereon.

A drum 24 is secured on the periphery of the clutch housing 23 to rotate with the latter and is equipped with slip rings 25, 26 which are connected electrically with a solenoid coil 27 within the clutch housing 23 so that said coil may be energized from a power source (not shown) as required via brushes 28 and 29 and the slip rings 25 and 26.

A cable or band 30 has one end secured to the drum 24 and a weight 31 secured to its other end. This cable or band 30 may be wound up on the surface of drum 24 in opposition to the action of gravity on weight 31 to provide rotational bias to drum 24 in one direction, for example, clockwise as seen in Figures 3 and 4. A ratchet wheel 32 is secured to the drum 24 and is engageable by a pawl 33. The pawl 33 is supported by a lever 34 so that when it engages a tooth of the ratchet wheel 32 it prevents the weight 31 from unwinding the cable or band 30 and rotating the drum 24.

The pawl carrying lever 34 is pivoted at 35 to a fixed bracket arm 36. A biasing compression spring 37 positioned between the lever 34 and a base bracket arm 38 exerts an upward thrust on lever 34 tending to disengage its pawl 33 from the teeth of ratchet wheel 32.

A solenoid 39 is secured to the base bracket 38 and has a movable armature core 40 which is pivotally secured at 41 to the lever 34 so that when the solenoid 39 is energized, it draws armature 40 into it and thus pulls lever 34 downward in opposition to the action of spring 37.

A secondary lever 42 is secured to the lever 34 to move correspondingly with the latter. This lever 42 carries a friction or brake pad 43 which is engageable with the peripheral surface of a friction clutch disk 44. The disk 44 is threadedly engaged with a screw extension 45 of the magnetic clutch housing 23. The brake pad 43 is supported by lever 42 in such position that it will frictionally engage clutch disk 44 only when solenoid 39 is de-energized. When the solenoid 39 is energized as shown in Figure 5, brake pad 43 does not engage the clutch disk 44. Also, at this time, the pawl 33 engages a tooth of ratchet wheel 32. On the other hand, when solenoid 39 is de-energized, spring 37 biases levers 34 and 42 upwardly to disengage pawl 33 from ratchet wheel 32 and simultaneously to engage brake pad 43 with clutch disk 44. Then weight 31 is free to unwind band 30 and thus to rotate drum 24 while disk 44 is maintained braked against rotation. The screw 45 then rotates in such direction relative to the braked disk 44 as to cause the latter to shift axially so that its side surface 46 frictionally engages a keeper disk 47 which is keyed to the drive shaft extension 20 and hence to the drive gear 16. The continued movement of weight 31 rotates shaft extension 20 and also gear 16 causing feed of control rod 13. The frictional engagement of pad 43 with disk 44 is less than the rotative force of the weight 31 so that although pad 43 remains engaged with disk 44 after the latter has engaged keeper disk 47, the pad does not prevent weight 31 from rotating disk 44 and keeper disk 47 when the two are brought into frictional engagement. Thus disk 47 rotates shaft extension 20 and gear 16 even though pad 43 remains engaged with disk 44.

*Operation*

Prior to start-up of the reactor, the magnetic clutches 19 and 21 are both energized and the motor 18 is rotated in, for example, a counter clockwise direction. The energization of clutch 21 causes engagement of its member 22 with housing 23 and thus a counter clockwise rotation of drum 24 thus winding band 30 thereon and lifting weight 31. At the same time, gear 16 operates its engaged rack to withdraw the control rod 13 fully from the reactor 10. When the rod 13 is fully withdrawn it operates a limit switch 48 which serves to de-energize the coil 27 of magnetic clutch 21 thus leaving drum 24 free to respond to the oppositely directed rotational force exerted by the weight 31 and band 30. However, at this time the solenoid 39 is also activated so that its core 40 moves lever 34 and its pawl 33 into engagement with the teeth of ratchet wheel 32 in opposition to spring 37 thus preventing rotation of drum 24.

Thereafter and throughout normal operation of the reactor, the solenoid 39 is maintained in energized condition and the coil 27 of magnetic clutch 22 in a de-energized condition while magnetic clutch 19 remains energized. Gear 16 then is responsive to direction of rotation of motor 18 and serves through its associated rack 15 to move the control rod longitudinally in desired direction in accord with direction of rotation of the motor 18 without any interference of the "scram" mechanism.

Upon occurrence of an emergency condition while the reactor is in operation, the magnetic clutch 19 is de-energized either manually or automatically. Solenoid 39 is simultaneously de-energized and clutch 21 maintained in de-energized condition.

The pawl 33 then disengages the teeth of ratchet wheel 32 and weight 31 unwinds band 30 on drum 24 rotating the latter in clockwise direction. Simultaneously the brake pad 43 engages clutch disk 44 braking its rotation and screw 45 acts on disk 44 to shift it laterally into frictional engagement with keeper disk 47 thus causing the latter and with it shaft extension to which it is keyed to rotate clockwise with drum 24 during continued unwinding of band 30 therefrom. This clockwise rotation of shaft extension 20 rotates gear 16 correspondingly and in turn drives rack 15 and its associated control rod 13 inwardly into the reactor to its fully inserted position.

The described arrangement thus provides "scram" mechanism associated with the control rod operating mechanism which provides no interference with required control rod movements during normal reactor functioning and which becomes effective instantaneously for "scram" operation when an emergency occurs.

Moreover, if electric power failure should occur at any time during reactor operation, the "scram" control rod moving mechanism will still be in active condition because at such time solenoids 27, 39 and clutch 19 and motor 18 will be in de-energized condition. In consequence, pawl 33 will disengage rack 32 under action of spring 37 and weight 31 will be free to fall and rotate the drive gear 16 as above described to move the control rod 13 into full core insertion position to stop the reactor. The arrangement in effect functions automatically as a safety whenever power failure occurs.

While a specific arrangement has been described, variations within the scope of the appended claims are possible and are contemplated. There is no intention, therefore, of limitation to the exact details herein described and shown.

What is claimed is:

1. Control rod operating mechanism for a reactor comprising a control rod, a rack secured to the control rod, a drivable gear meshing with said rack to effect longitudinal movement of the control rod, a drive shaft for the gear, magnetic clutch means including a member fixed to said shaft and a member freely rotatable thereon, said two members being movable into frictional engagement by energization of the magnetic clutch means, a drum member secured to the freely rotatable member, a ratchet wheel secured to said drum member, a band secured to said drum member, a weight suspended from the band, a pawl normally biased into non-engaging position with said ratchet wheel, a brake drum threadedly engaged with said freely rotatable member and displaceable axially along said shaft, a braking member normally engaged with said brake drum, solenoid means for moving the pawl into ratchet engaging position and the braking member into a release position, a keeper member fixed to said shaft and engageable with said brake drum in a displaced position of the latter occurring when said pawl releases said ratchet, whereby rotation then imparted to said drum member by the unwinding of said band by said weight rotates said shaft and said gear.

2. In a control rod actuator arrangement having reciprocatory means for moving a control rod inwardly and outwardly with respect to the core of a neutronic reactor, a fail-safe gravity-operated drive for promptly inserting said control rod into said core in the event of an emergency condition, said gravity-operated drive comprising a rotatable drive shaft operatively coupled to said reciprocatory means, first and second threadedly connected clutch members freely rotatable on said drive shaft, a pendent weight adapted to rotatively screw said clutch member into frictional engagement with said second clutch member and laterally displace same, selective restraining means for alternately preventing rotation of said first clutch member and braking rotary motion of said second clutch member, and a third clutch member fixed to said shaft adjacent said second clutch member so as to frictionally engage said second clutch member upon lateral displacement thereof, whereby rotary motion induced by said pendent weight is directly imparted by said clutch arrangement to said shaft for bringing about the insertion of said control rod into said core.

3. The device of claim 2 wherein said pendent weight is connected to said first clutch member by flexible suspensory means windable thereon.

4. The device of claim 3 including a reversible motor for driving said shaft, and an electromagnetic clutch member fixed to said shaft adjacent said first clutch member selectively engageable therewith for winding said flexible suspensory means on said first clutch member.

5. In a control rod actuator arrangement having reciprocatory means for moving a control rod inwardly and outwardly with respect to the core of a neutronic reactor, said reciprocatory means being actuated by a drive means including a rotatable drive shaft, a reversible motor, and means for selectively coupling said motor to said shaft for normal operative movement of said control rod, a fail-safe gravity-operated drive for promptly inserting said control rod into said core upon the occurence of an emergency condition, said gravity-operated drive comprising an intertial member freely rotatable on said shaft having a flexible suspensory means wound thereon, a pendent weight connected to one end of said suspensory means, detent means for preventing rotation of said inertial member by said weight during normal operation of said control rod, and for permitting said rotation in a core-inserting direction upon the occurrence of an emergency condition, a first clutch member threadedly connected to said inertial member and freely rotatable with respect to said shaft, brake means for restraining rotation of said first clutch member during rotation of said inertial member, thereby causing said inertial member to screw into frictional engagement with said first clutch member and be laterally displaced thereby, and a second clutch member fixed to said shaft which is frictionally engaged by said first clutch member upon lateral displacement thereof, whereby the rotation induced by said weight is directly imparted by said clutch members to said shaft for bringing about insertion of said control rod into said core.

6. The device of claim 5 wherein said detent means comprises a ratchet wheel secured to said inertial member, a solenoid-actuated pawl engageable with said ratchet wheel, and spring means for disengaging said pawl from said ratchet wheel upon deenergization of said solenoid.

7. A gravity-operated drive for promptly inserting a control rod into the core of a neutronic reactor in the event of an emergency condition comprising a rotatable shaft, means for translating reciprocatory motion to the control rod from rotary motion to the shaft, a magnetic clutch having a first clutch member fixed to the shaft and an adjacent second clutch member freely rotatable on the shaft, said second magnetic clutch member having a flexible suspensory means wound thereon, a weight secured to said suspensory means for imparting rotary motion to said second magnetic clutch member, a first mechanical clutch member freely rotatable on the shaft threadedly connected to said second magnetic clutch member and laterally displaceable thereby, detent means for preventing rotation of said second magnetic clutch member during normal operation of said control rod, brake means for restraining rotation of said first mechanical clutch member upon the occurrence of an emergency condition, a solenoid-actuated means for alternately operating said detent means and said brake means, and a second mechanical clutch member fixed to the shaft, frictionally engageable with said first mechanical clutch upon lateral displacement thereof, whereby rotary motion of said second magnetic clutch member may be imparted to said shaft.

8. A reactor of the character described having a core, tubular members disposed in tiers and extending horizontally into said core, control rods movable in said tubular members axially into and out of said core, racks connected to the control rods, driving gears meshing with the racks, motor means for driving the gears in desired direction of rotation, electro-magnetic clutch means between the gears and their motors to maintain coupling between them during normal reactor operation, gravity activated means for driving the gears in a core-insertion moving direction of the control rods, each said gravity-activated means comprising a rotatable drum having a flexible suspensory means wound thereon, a weight suspended by said flexible suspensory means from the rotatable drum, a ratchet wheel secured to the drum, a pawl normally biased into non-engaging relation to said ratchet wheel, a brake drum threadedly engaged with said rotatable drum and displaceable axially along said shaft, a braking member normally engaged with said brake drum, solenoid means for moving the pawl into ratchet engaging position and the braking member into a release position, a keeper member fixed to said shaft and engageable with said brake drum in a displaced position of the latter occurring when said pawl releases said ratchet, whereby rotation then imparted to said drum member by the unwinding of said suspensory means by said weight rotates said shaft and said gear in required reactor stopping direction.

References Cited in the file of this patent

UNITED STATES PATENTS

| | | |
|---|---|---|
| 2,088,648 | Hansen | Aug. 3, 1937 |
| 2,781,308 | Creutz et al. | Feb. 12, 1950 |
| 2,782,941 | Lichtenberger et al. | Feb. 26, 1957 |
| 2,816,860 | Wilson et al. | Dec. 17, 1957 |

OTHER REFERENCES

Schultz: Control of Nuclear Reactors and Power Plants, McGraw-Hill Book Co., N.Y. (1955), pages 116–117.